US00H002112H

(19) United States
(12) Statutory Invention Registration
Mignogna et al.
(10) Reg. No.: US H2112 H
(43) Published: Dec. 7, 2004

(54) METHOD FOR MEASURING COATING THICKNESS USING ULTRASONIC SPECTRAL TRACKING

(75) Inventors: Richard B. Mignogna, Laplata, MD (US); Kirth E. Simmonds, Clinton, MD (US); Narendra K. Batra, Springfield, VA (US)

(73) Assignee: The United States of America as represented by the Secretary of the Navy, Washington, DC (US)

(21) Appl. No.: 09/986,258

(22) Filed: Nov. 8, 2001

(65) Prior Publication Data

US 2003/0084725 A1 May 8, 2003

(51) Int. Cl.[7] ..... G01M 7/00; G01N 29/02
(52) U.S. Cl. ..... 73/579; 73/597
(58) Field of Search ..... 73/579, 658, 659, 73/602, 615, 609

(56) References Cited

U.S. PATENT DOCUMENTS

| | | | | |
|---|---|---|---|---|
| 4,512,194 A | | 4/1985 | Beuter | |
| 4,625,556 A | | 12/1986 | Sukahara et al. | |
| 4,817,430 A | * | 4/1989 | Benes et al. | 73/579 |
| 4,862,747 A | | 9/1989 | Boudy et al. | |
| 5,557,970 A | | 9/1996 | Abbate et al. | |
| 5,608,165 A | | 3/1997 | Mozurkewich, Jr. | |
| 5,723,791 A | | 3/1998 | Koch et al. | |
| 5,942,687 A | | 8/1999 | Simmonds et al. | |
| 6,253,615 B1 | * | 7/2001 | Simmonds et al. | 73/579 |

FOREIGN PATENT DOCUMENTS

| | | | | |
|---|---|---|---|---|
| JP | 03137504 A | * | 6/1991 | G01B/17/00 |

* cited by examiner

*Primary Examiner*—Daniel Pihulic
(74) *Attorney, Agent, or Firm*—John K. Karasek; Joseph T. Grunkemeyer

(57) ABSTRACT

A method and an apparatus are provided for measuring the thickness of a coating material using ultrasonic signals. A broad band of frequencies is transmitted by a transducer towards a layer of coating layer on a substrate and a trailing signal is received from the coating layer/substrate interface while a leading backscattered signal from a fluid/coating layer is gated out. The trailing signal is deconvolved into a set of frequencies. The resonant frequency of the coating layer is determined as the frequency with the greatest amplitude. The thickness of the material is calculated as a function of the resonant frequency of the coating layer.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR MEASURING COATING THICKNESS USING ULTRASONIC SPECTRAL TRACKING

STATEMENT REGARDING FEDERALLY SPONSORED RESEARCH

This invention was made by employees of the United States Government and may be manufactured and used by or for the Government for governmental purposes without the payment of any royalties.

BACKGROUND OF THE INVENTION

1. Field of the Invention

This invention relates generally to the field of coating thickness measurement, and more specifically, to a method for measuring a coating thickness using ultrasonic signals and for processing thereof.

2. Background of the Invention

There is interest in the art in improving the methods currently used for measuring the thickness of coating layers under a variety of conditions, including those wherein there is limited access to the layer itself. Such thickness measurements can be used to provide control and monitoring of the thickness of various types of coating layers such as protective layers or deposits.

Of particular importance is the thickness measurement of protective layers used in coating a bottom surface of a tank against corrosion. Rupture of a tank can have devastating consequences such as a highly negative environmental impact. Contactless and nondestructive measuring using ultrasonics permits coated regions, which are inaccessible from the outside (e.g., such regions as tank bottoms) are to be examined.

Conventional methods for measuring the thickness of a coating layer formed on a substrate include the use of ultrasonic waves. According to these methods, ultrasonic waves are generally applied to the coating layer and a substrate through a liquid medium providing ultrasonic propagation. Reflected ultrasonic waves are then detected by a suitable detector.

Coating thickness is typically measured using a technique known in the art as the ultrasonic pulse-echo method. Using this method, a coating thickness is measured based on an evaluation of the ultrasonic wave propagation delay between echoes from the lower surface of the coating layer and the upper surface of the coating layer. However, if the coating layer thickness is such that the echoes are superposed on each other or otherwise interfere with one another to produce a single signal whose characteristics cannot be resolved, this method is ineffective. Therefore, this ultrasonic pulse-echo method is, in general, only applicable to measuring only relatively thick coating layers.

One possible way to enhance measurement of thin coating layers using ultrasonic pulse-echo techniques is to use higher ultrasonic frequencies. The use of such higher frequencies assists in the evaluation of thinner layers because higher frequency signals are less difficult to resolve because of shorter wavelengths. However, at higher frequencies, surface roughness (which can produce ultrasonic scattering) and sound absorption within the layer (i.e., attenuation of the ultrasonic signal) reduce the effectiveness of this approach.

Our U.S. Pat. No. 5,942,687 to Simmonds et al., disclosed an ultrasonic measuring method for determining the thickness of a substrate in the form of a single metal layer wherein a broad band ultrasonic pulse is directed at the metal layer from an ultrasonic transducer. A Fourier analysis is performed on a return signal from the metal layer to generate a frequency domain signal, and the thickness of the metal layer is determined from the frequency domain signal. A suitable signal processing delay of at least two microseconds is provided to eliminate the initial unwanted portion of the signal.

A different technique is required for measuring the thickness of a coating material on a substrate metal layer, i.e., a technique other than the technique used for the measurement of a single metal layer disclosed in the Simmonds et al. patent. In order to determine the thickness of such a coating layer using the method of the patent, the coating material of the layer would have to be effectively separated from the metal substrate. Further, if the method uses a microsecond delay, or longer, in obtaining a return signal from a single metal layer, the method is "blind" to the presence of the coating layer. In addition, only a fraction of the total energy sent to the coated surface will be "trapped" in the coating and reflected back to the transducer from the coating/metal interface, and the "trapped" energy will pass into the metal layer.

Further differences in the physical characteristics between a metal substrate and a coating layer prevent the use of the method of the patent in measuring the thickness of a coating layer. A single layer of steel or similar metal provides a relatively low attenuation of the input signal, i.e., the corresponding signal dies slowly. However, a coating layer, which is often a polymer, provides a high attenuation of the input signal, i.e., the corresponding signal dies quickly.

BRIEF SUMMARY OF THE INVENTION

The present invention is directed to a method for measuring the thickness of a coating layer on a metal substrate. A broad band of frequencies is transmitted by a transducer towards a coating layer, which is above a substrate layer and is below a fluid layer. A backscattered signal is reflected from a fluid/coating layer interface, and a trailing signal is reflected from a coating layer/substrate interface. The trailing signal reaches the transducer after a time delay relative to the backscattered signal. The trailing signal is discriminated from the backscattered signal based on the time delay. As a result, only the trailing signal will be processed. The trailing signal is deconvolved into a set of frequencies. The amplitude of each frequency of the trailing signal is then measured. The frequency, which has the greatest amplitude, is determined to be the resonant frequency of the coating layer. The resonant frequency is then used to calculate the thickness of the coating layer.

In another aspect of the present invention, an apparatus is provided for measuring the thickness of a coating layer having a resonant frequency and being deposed on a substrate between the substrate and a fluid so as to create a fluid/coating interface and a coating/substrate interface. The apparatus includes a transducer, a signal receiving device, and a signal processor. The transducer is for transmitting an incident signal comprising a broad band of frequencies towards the coating layer. The signal-receiving device receives a backscattered signal from the fluid/coating interface and a trailing signal from the coating/substrate interface after a time delay relative to the backscattered signal. The signal processor is operably associated with the signal-receiving device and establishes a signal-processing window based on the time delay such that only the trailing signal is processed. Further, the signal processor is for (i) measuring the amplitude of each frequency component of the trailing signal, (ii) determining the resonant frequency of the coating layer as the frequency component with the greatest amplitude, and for (iii) calculating the thickness of the coating layer using the resonant frequency so determined.

Other features and advantages of the invention will be set forth in, or will be apparent from, the detailed description of the preferred embodiments, which follows.

DETAILED DESCRIPTION OF THE INVENTION

Figure 1:
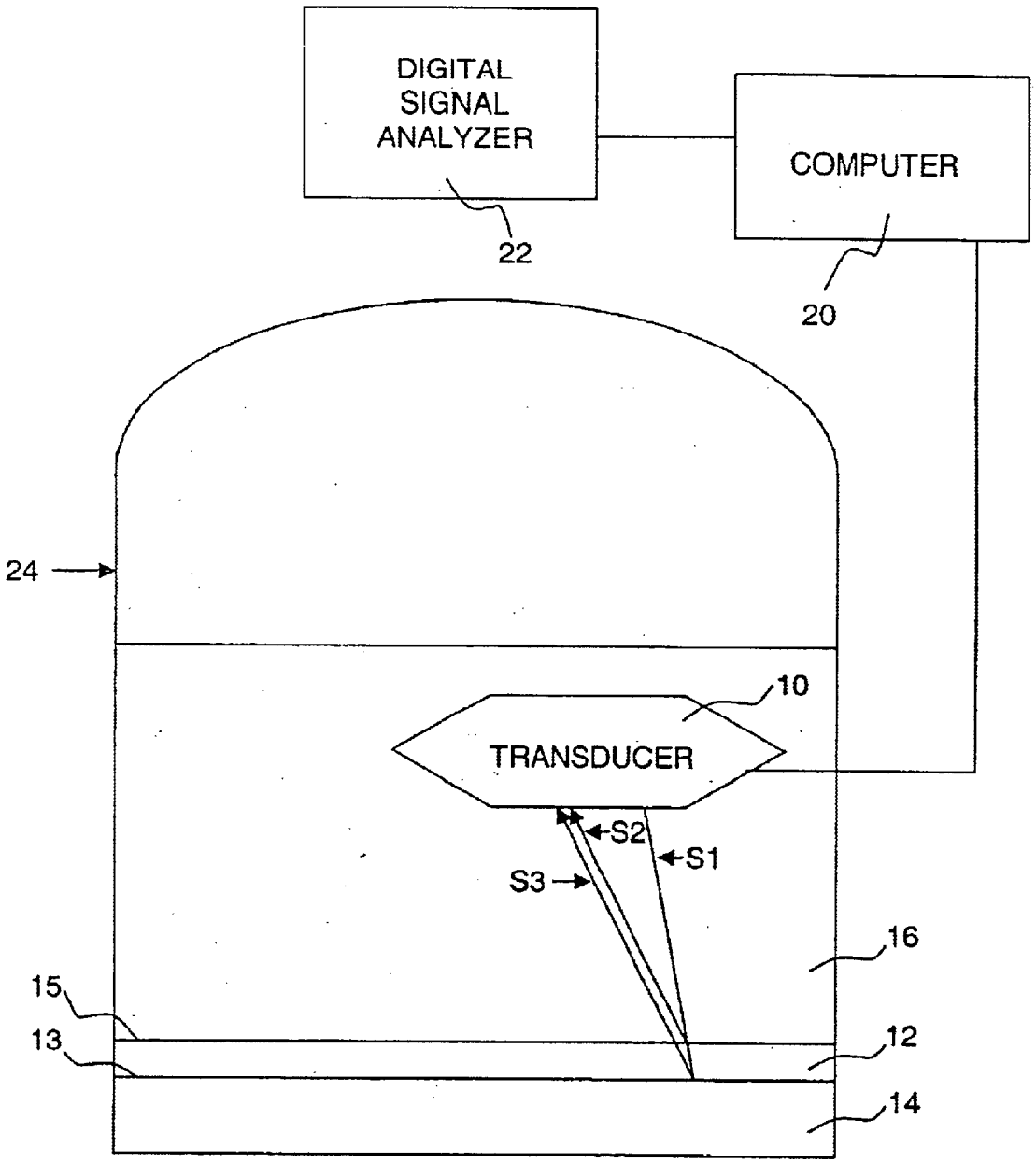
FIG. 1 is a schematic diagram of a preferred embodiment of the coating thickness measurement apparatus of the present invention, illustrating the operation thereof.

Referring to the single figure in the drawings, a transducer 10 is adapted to transmit at a broad band of frequencies. The broad band of frequencies is transmitted by the transducer 10 as a signal, denoted S1. Transducer 10 may comprise a dual element transducer wherein separate elements are used for the transmitter and receiver functions. Alternatively, transducer 10 may comprise a single element, dual function, and transducer.

The signal S1 is transmitted towards a coating layer 12, the thickness of which is to be measured. The coating layer 12 is formed on a substrate 14. In this embodiment, a fluid layer or medium 16 is located between the transducer 10 and the coating layer 12. The substrate 14 with coating layer 12 and fluid layer or medium 16 is all located within a tank 24.

A pair of signals containing a particular set of frequencies is reflected from different portions of the coating layer 12, viz., a backscattered signal, denoted S2, and a trailing signal, denoted S3. The set of frequencies is typically at least 10 MHz. The backscattered signal S2 is reflected from a fluid/coating layer interface 15 located between the coating layer 12 and the fluid 16. The trailing signal S3 is reflected from a coating layer/substrate interface 13, located between the coating layer 12 and the substrate 14. The coating layer/substrate interface 13 is located further from the transducer 10 than the fluid/coating interface 15.

The frequencies contained in the trailing signal S3 include the resonant frequency of the coating layer 12. The resonant frequency has more energy, i.e., higher amplitude, relative to the other frequencies contained in the trailing signal S3.

The trailing signal S3 is the signal of interest in determining the thickness of the coating layer 12. Conversely, the backscattered signal S2 is an essentially undesirable signal, which does not include usable information concerning coating thickness.

The trailing signal S3 typically trails (i.e., lags behind) the backscattered signal S2 by 0.5 or less microseconds, depending upon the thickness of the coating layer 12. This delay, caused by the coating thickness, makes the measurement of the coating layer possible.

A signal processor 20 is connected to an output of the transducer 10 and receives an electrical signal output therefrom based on the backscattered signal S2 and the trailing signal S3 but filters out or discriminates (gates out) eliminates signal S2 and only processes signal S3. In further one embodiment, the first received signal, i.e., the backscattered signal S2 is used to trigger a suitable delay in signal processing, corresponding to the delay between signals S2 and S3.

The signal processor 20 then deconvolves the signal S3 so as to break the trailing signal down into individual frequencies, i.e., the trailing signal is Fourier analyzed and converted to a set of frequencies. The signal processor 20 then determines which frequency has the greatest amplitude. This determination can be made after the signal S3 is Fourier converted from a time domain into a frequency domain wherein amplitude is a function of frequency.

The frequency having the greatest amplitude is typically the resonant frequency. The resonant frequency is directly related to the thickness of the coating layer 12.

However, the broad band of frequencies contained in signal S1 may include a main transmitting frequency close to the base resonant frequency of the coating layer 12. If the main transmitting frequency of signal S1 is extremely close to the base resonant frequency of the coating layer 12, the coating resonant frequency is unresolvable from the main transmitting frequency without further processing. When this is the case, one of more reference surface reflections (i.e., further signals) from the same material (i.e., from the coating layer 12 or very similar material) after being converted to frequencies, is needed to deconvolve the trailing signal obtained from the coating layer to be measured. Comparison of these known surface reflection frequencies to the unresolvable trailing signal can then be used to subtract out that portion of the trailing signal resulting from the main transmitting frequency of the transducer.

The resolving of the resonant frequency accuracy is dependent upon the number of sample points taken in the time domain. With increased sampling points there is an increased frequency resolution (i.e. more discrete frequency components) in the Fourier domain (or frequency domain), thus increased accuracy in acquiring the resonant frequency for calculating coating thickness. The Fourier Transform is taken of the temporal surface reflection (S2) and also of the time gated trailing signal (S3) to obtain frequency sets for S2 and S3. The surface reflection does not contain any information about the coating. By subtracting the frequency set of the surface reflection from the frequency set of the trailing signal, the main transmitting frequency is removed.

It is not necessary to resolve time the backscattered signals, as is typically the case when using a pulse-echo method. Further, because the backscattering signal is eliminated from the calculations, and because the method does not use temporal comparisons, the present method is effective in measuring the thickness of coating layers which are thin and/or which have rough surfaces.

Finally, a calculation unit 22, connected to the signal processor 20, calculates the thickness of the coating layer 12 using the resonant frequency. The calculating unit 22 uses a formula which divides the ultrasonic velocity of the trailing signal, S3, by one half of the now known resonant frequency to determine the thickness of the coating layer 12 as the resonant frequency is proportional to the coating thickness. The actual ultrasonic velocity of the coating layer 12, or an agreed upon table of velocities, is used to yield a thickness value.

The actual ultrasonic velocity is used to yield the coating layer thickness as follows:

$$T = \frac{1}{2}\left[\frac{v}{f_r}\right]$$

Where T is the coating thickness, v is the actual or measured ultrasonic velocity (in the same manner v could be a table or nominal value) and $f_r$ is the fundamental resonant frequency of the coating layer.

Although the invention has been described above in relation to preferred embodiments thereof, it will be readily understood by those skilled in the art that variations and modifications can be effected in those embodiments without departing from the scope and spirit of the invention.

What is claimed is:

1. A method for measuring the thickness of a coating layer on a substrate between the substrate and a fluid so as to create a fluid/coating interface and a coating/substrate interface, the method comprising the steps of:

(a) transmitting a signal comprising a broad band of ultrasonic frequencies to the coating layer using a transducer so that a backscattered signal is reflected from the fluid/coating interface, and a trailing signal is reflected from the coating/substrate interface and the trailing signal reaches the transducer after a time delay relative to the backscattered signal;

(b) discriminating between the backscattered and trailing signal based on said time delay such that only the trailing signal from the coating layer/substrate interface is processed;

(c) deconvolving the trailing signal into a set of frequencies, each frequency component of the set of frequencies having an amplitude;

(d) measuring the amplitude of each frequency component of the set of frequencies;

(e) determining the resonant frequency of the coating layer as the frequency component of the set of frequencies with the greatest amplitude; and (f) calculating the thickness of the coating layer using the resonant frequency.

2. The method according to claim 1, wherein said ultrasonic frequencies include a main transmitting frequency and further comprising the steps of:

obtaining at least one reference signal from the backscattered signal;

comparing the reference signal with the trailing signal; and using the reference signal in deconvolving signal artifacts from the trailing signal attributable to the main transmitting frequency of the ultrasonic frequencies.

3. The method according to claim 1, wherein the trailing signal has an ultrasonic velocity associated with the coating layer and said step (f) is carried out by using a combination of the resonant frequency and the velocity of the trailing signal.

4. An apparatus for measuring the thickness of a coating layer having a resonant frequency and being deposited on a substrate between the substrate and a fluid so as to create a fluid/coating interface and a coating/substrate interface, said apparatus comprising:

a transducer for directing a transmitted signal comprising a broad band of frequencies towards the coating layer;

a signal receiving means for receiving a backscattered signal from the fluid/coating interface and a trailing signal from the coating/substrate interface after a time delay relative to said backscattered signal; and a signal processing means, including a Fourier analyzer for deconvolving the trailing signal into a set of frequencies, associated with said signal receiving means, for establishing a signal processing window based on said time delay and for (i) measuring an amplitude of each frequency component of the set of frequencies, (ii) determining the resonant frequency of the coating layer as the frequency component with the greatest amplitude, and (iii) calculating a thickness of the coating layer using the resonant frequency so determined.

5. The apparatus according to claim 4, wherein said signal receiving means is part of and located within said transducer.

6. The apparatus according to claim 4, wherein said signal receiving means is separate from said transducer.

7. The method according to claim 2, wherein said step of using the reference signal in deconvolving signal artifacts from the trailing signal comprises subtracting the reference signal from the deconvolved trailing signal.

* * * * *